UNITED STATES PATENT OFFICE.

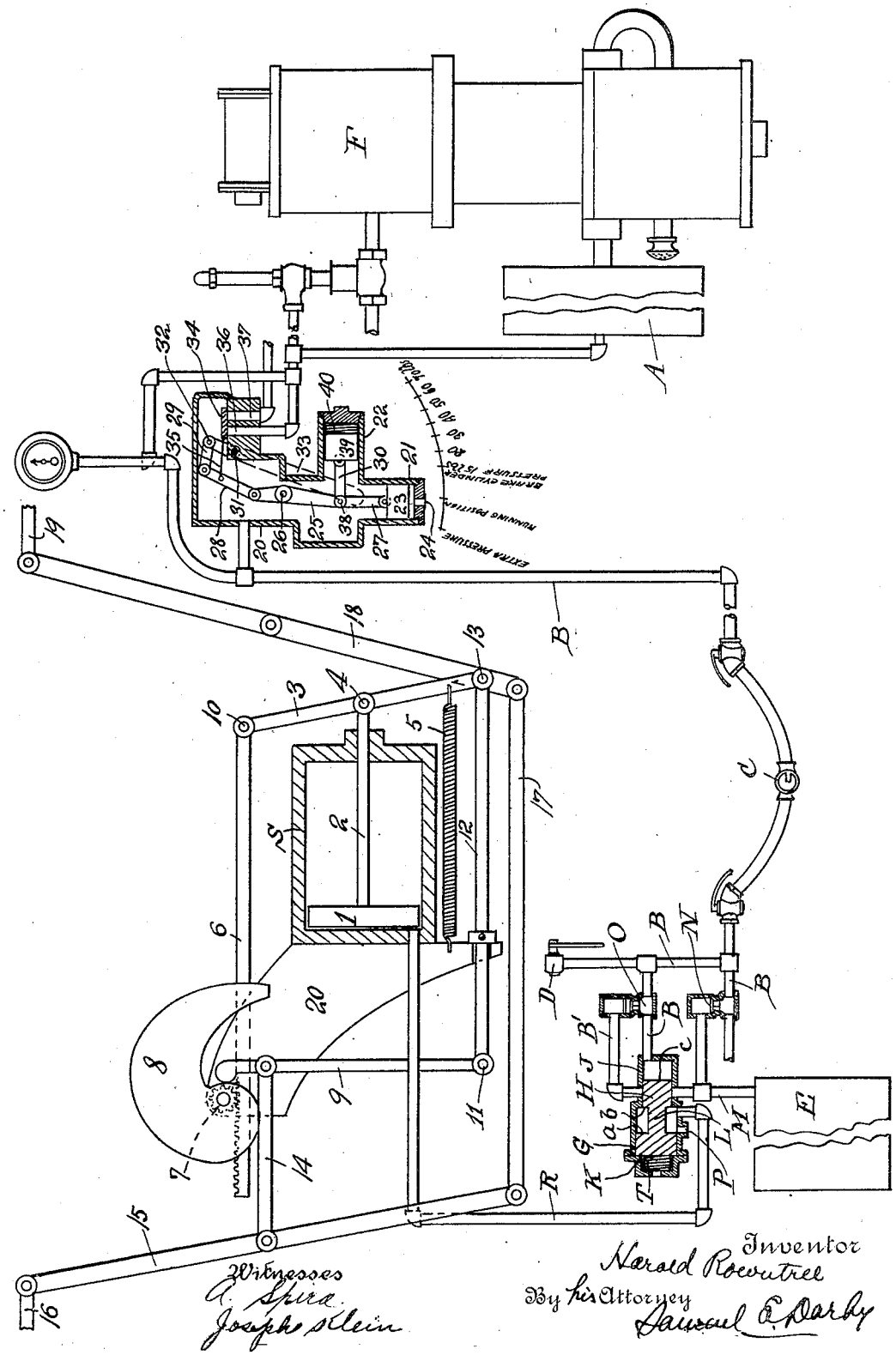

HAROLD ROWNTREE, OF CHICAGO, ILLINOIS.

AIR-BRAKE SYSTEM.

No. 890,930.  Specification of Letters Patent.  Patented June 16, 1908.

Application filed March 30, 1907. Serial No. 365,551.

*To all whom it may concern:*

Be it known that I, HAROLD ROWNTREE, a citizen of the United States, and resident of Chicago, county of Cook, and State of Illinois, have made a certain new and useful Invention in Air-Brake Systems, of which the following is a specification.

This invention relates to air brake systems.

The object of the invention is to provide a self regulating system of operation of air brake, which is simple and efficient and at the same time positive and reliable and free from the many uncertainties inherent in present systems.

A further object is to provide a system of the nature referred to wherein the amount of pressure applied to the brake will be dependent solely on the position of the engineer's control handle.

A further object of the invention is to provide an air brake system wherein the operation of the triple valve shall be such that the brake pressure shall always vary in inverse relation to the train pipe pressure.

A further object is to provide means whereby the action of the triple valve and therefore the resulting brake pressure cannot be affected by leaks in the triple valve, or by variations in pressure in the auxiliary tank.

A further object of the invention is to provide means whereby a variation in the auxiliary tank pressure is not an essential part of the system, and therefore the auxiliary tank can be made as large as desired, and so enable the maximum possible brake pressure to be but little below the original auxiliary tank pressure.

A further object is to provide an equipment of air brake mechanism whereby a car equipped therewith can be coupled up and operated in connection with cars equipped with existing air brake systems, and, controlled by the ordinary form of engineer's control valve.

Other objects will appear more fully hereinafter.

The invention consists substantially in the construction, combination, location, and relative arrangement of parts, all as will be more fully hereinafter set forth, as shown in the accompanying drawing, and finally pointed out in the appended claims.

The single view of the drawing is a diagram, parts in section, and parts in elevation, showing an air brake system embodying the principles of my invention.

The main tank A, train pipe connections B, hose couplings C, emergency valves D, auxiliary tank E, and compressor F, may all be of the usual or any ordinary, well known, suitable, or convenient construction or arrangement, and in the details of construction thereof form no part of my present invention.

The triple valve casing is designated by reference sign G, and in this casing operates the valve, which is provided with a portion H of reduced diameter arranged to operate in a reduced extension or portion J, of the casing. Into this extension delivers a train pipe connection B. The reduced portion H, of the valve is connected with the larger portion K, through the intermediate stem L, thereby leaving opposed piston faces $a$ and $b$, of differing areas on the portions K, and H, respectively of the valve. The pipe connection M, delivers from the auxiliary tank E, to the triple valve casing extension J, and an auxiliary train pipe connection B', also delivers to said extension. A valve N is arranged in the connection of the train pipe B to the auxiliary tank, and, similarly, a valve O, is arranged in the auxiliary train pipe connection B', said valves being arranged to seat towards the train pipe. The portion H, of the valve controls the connection of pipes M, and B', to the valve casing. An exhaust port P, is provided in the triple valve casing, and is controlled by the portion K, of the valve. A connection R, extends from the valve casing to the brake cylinder S.

From the foregoing description it will be seen that the triple valve is moved in one direction by the train pipe pressure, admitted to extension J, of the casing, through train pipe connection B, operating against the piston face $c$. The movement of the triple valve in the direction of the impelling force of the train pipe pressure, thus applied, may be opposed in any suitable or convenient manner. I have shown a most simple and efficient arrangement wherein a spring T, is interposed between the casing and the end of the portion K, of the valve, as clearly shown, and while, for many reasons, I prefer to employ a spring having the purpose, function, and arrangement described, I do not desire to be limited or restricted in this respect.

With the construction and arrangement above described it will be readily seen that the movements of the triple valve are not dependent upon variations in the auxiliary tank pressure, and are influenced solely by variations in the train pipe pressure, and the variations in the brake cylinder pressure acting on the faces, $a$, and $b$.

The operation of the triple valve can best be illustrated by specific examples. Suppose, for instance, the area of the larger piston of the valve is 8 square inches and that of the smaller piston 6 square inches, and that a pressure of 390 pounds will hold the valve in position to close the connections M, and B', and to open the brake cylinder connection R, to exhaust, this being the position of the parts as shown in the drawing, and the position occupied under normal running conditions. Now, under these conditions a pressure of 70 pounds upon the smaller piston of the valve, that is, a train pipe pressure of 70 pounds, will give a total pressure of $6 \times 70$ or 420 pounds on the valve, and so hold the said valve in the position shown in the drawing, that is, with the auxiliary and train pipe pressure cut off from the brake cylinder, and said cylinder open to the exhaust. Now suppose the train pipe pressure should be lowered to, say, 60 pounds; then the pressure on the valve piston is $6 \times 60$, or 360 pounds, which is lower than the amount required to hold the same in lap position, as in the example above given, and hence the valve will begin to move under the influence of the spring T, or other medium, opposing the train pipe pressure thereon, and thus close the brake cylinder exhaust port, and open the auxiliary tank connection to the brake cylinder through the space between the pistons H, and K, and hence the brake will be applied. The brake cylinder pressure is thus imposed upon the differing piston areas $a$, and $b$, and therefore, as soon as the brake cylinder pressure reaches, say, 15 pounds, the following equation is established:— $15 \times (8-6)$ plus $60 \times 6$ equals 390, and hence, since this is the pressure required, in the example taken, to maintain the triple valve closed, or in lap position, the valve will automatically move into such lap position as soon as the brake cylinder pressure attains fifteen pounds. Similarly, suppose the train pipe pressure should be caused to fall to 50 pounds then, $A^2$ multiplied by the difference in piston areas, plus $50 \times 6$, equals 390 only when $A^2$, which represents the brake cylinder pressure, equals 45 pounds. In other words in this instance as soon as the brake cylinder pressure equals 45 pounds the valve again closes when the train pipe pressure is fifty pounds. In the same way it may be shown that when the train pipe pressure falls to 40 pounds, the brake cylinder pressure will reach 75 pounds, provided the auxiliary tank is of sufficient size and contains sufficient pressure to produce that pressure in the brake cylinder. With the train pipe pressure at 40 pounds and the brake cylinder at 75 pounds, an increase in the train pipe pressure to say 50 pounds, results automatically in a reduction in the brake cylinder pressure to 45 pounds, the triple valve automatically operating under these conditions to produce such result and so on with other variations. So, too, in case the air should leak in or out of the triple valve casing, or through the valve, or otherwise, the valve will move slightly to exhaust or pressure position, as the case may be, and so adjust itself as to balance the leak, thereby keeping the brake cylinder pressure constant regardless of leaks.

From the foregoing description it follows that the brake cylinder pressure varies automatically in inverse ratio as the train pipe pressure varies, and regardless of any leaks in any part of the triple valve, or of variations in the auxiliary tank pressure.

By providing the train pipe connection B', to the triple valve, independently of the auxiliary tank, and which connection is opened to the brake cylinder at the same time with the auxiliary tank, I secure the advantage, in long trains, of quickly reducing the train pipe pressure, throughout the length of the train, by admitting a portion of such pressure to the brake cylinder of each car, thereby making the application of the brakes more nearly simultaneous throughout the train. This however, does not result in effecting the total braking pressure exerted by the brakes, nor is it essential to the operation of the system, but it secures the advantage noted and hence is a desirable feature in the system.

It is obvious that auxiliary tank pressure might be used in place of the spring T, to perform the same function, but I prefer to use the spring as variations in the auxiliary tank pressure cannot be entirely avoided and hence, if auxiliary tank pressure were used, variations therein would result in causing the brake pressure to vary somewhat from truly inverse proportion to the train pipe pressure. If, however, the auxiliary tank should be made sufficiently large, variations in the pressure therein could be so reduced as to be practically negligible in practice. My invention, therefore, in its broadest scope is not to be limited to the particular form of opposing medium in the situation referred to, the essential feature being that the action of the triple valve is due to the combined effect of the train pipe pressure and the brake pressure, a lessening of one necessarily meaning a corresponding increase of the other before equilibrium can again be established.

The brake applying apparatus employed in connection with the system may be of any suitable or convenient construction, and, so far as the breadth and scope of my present invention, sought to be secured herein, is concerned, and the specific construction of such apparatus is not of consequence so long as it is of such construction and arrangement as to accomplish the application of the braking effort and in accordance with the relation and coöperative operation of the triple valve as above described, and whereby the brake cylinder pressure is inversely proportional to the train pipe pressure. In the particular form shown, to which, however, my invention is not to be limited or confined, a piston 1, is arranged to operate in the cylinder S, to the stem 2, of which, is pivotally connected a lever 3, at a point intermediate its ends, as at 4. Near one end of lever 3, is connected a strong spring 5, the tension of which is normally exerted upon the lever 3, to rock the same about its pivot 4. To the other end of lever 3, as at 10 is connected a rack bar 6, with which coöperates a pinion 7, connected to the hub of a cam, whereby when the bar 6, is moved the cam 8 is rotated. The cam bears against one end of a lever 9. To the other end of the lever 9, is connected as at 11 a rod 12, the other end of said rod being connected, as at 13, to the end of lever 3. A link 14, connects the lever 9 to the brake lever 15, to which the brake rod 16, is connected in the usual manner. The brake lever 15, is also connected by rod 17, to a coöperating brake rod 19, in the usual manner.

The operation of the brake mechanism is as follows: When pressure is admitted to the brake cylinder S, by the operation of the triple valve, as above explained, the first effect, the spring 5, being under sufficient tension, is to rock said lever 3, about its pivot 4, the point 13 becoming the fulcrum, and in a direction to shift the rod 6 towards the right thereby causing the pinion 7 to be rotated, and hence rotating the cam 8. By the bearing of the cam surface against the end of lever 9, said lever is rocked about the point 11, as a fulcrum, thereby drawing on the link 14, and hence through the equalizing levers 15, 18, connecting rod 17, and brake rods 16 and 19, effecting a preliminary application of the brakes, sufficient to take up lost motion of the parts and to compensate for any wear on the braking surface of the shoes. When the braking pressure thus applied is sufficient to overcome the tension of the spring 5, the fulcrum of lever 3, is transferred from the point 13, to the point 10, and thereafter, through the rod 12, the lever 9 is rocked about the point of bearing contact of the end thereof against the cam surface 8. The link 14, is connected to the rod 9, at a point closely adjacent its point of bearing contact against the cam 8, and consequently the application of the pull thereon exerted through the rod 12 is through a long leverage, thereby greatly increasing the braking effort of the brakes.

I do not claim herein except in its combinative and coöperative relation the particular construction and arrangement of braking mechanism as the same forms the subject matter of a separate application, but I have shown and described a particular construction in order to show the relation and coöperative arrangement of the triple valve and the engineer's valve controlling mechanism employed in a complete operating brake system which forms the subject of my present invention.

In an air brake system embodying the principles of my invention, and in coöperation with the brake mechanism and triple valve above described, I employ an engineer's control valve so constructed and arranged as to control the brake applying pressure by regulating the train pipe pressure, and hence the triple valve, such control being in definite relation with reference to the position of the control valve handle. In other words, I employ an engineer's control valve in connection with the system forming the subject matter of the present invention, wherein the various positions of the operating lever of the control valve bears definite relations to the degrees of pressure admitted to the brake cylinder. Many specifically different constructions of engineer's control valve may be devised for accomplishing this result. While, therefore, I have shown, and will now describe, one construction for accomplishing the desired objects, my invention is not to be limited or restricted thereto. In this particular form shown the operation of the valve is controlled by the joint and coöperative action of an operating lever and the train pipe pressure the latter being opposed in a suitable manner.

Reference sign 20 designates the control valve casing having the cylinders 21, 22, in the former of which operates a close fitting piston 23, said cylinder being opened to the atmosphere as at 24. A rock lever 25, pivotally mounted between its ends, as at 26, has one end thereof connected through a link 27, to piston 23, and the other end connected through the pivoted links 28, 29, to one end 32, of a lever pivotally mounted as at 31, the other end 33, of said lever serving as an operating handle. The valve 34, is connected by a rod 35, to the link 28, said valve controlling the pressure supply and exhaust ports 36 and 37. At the point 38, of connection of the lever 25, to the link 27, is connected a link 30, the other end of which is connected to a piston 39, operating loosely in the cylinder 22, and behind which is a spring 40, or other suitably arranged pressure medium. In practice I prefer to arrange the cylinders 21, and 22 in substantially right angular relation with respect to each other.

It will be observed that the train pipe pressure is always imposed upon the piston 23, tending to move the same to the limit of its stroke in the cylinder 21, while such pressure equalizes on opposite sides of the piston 39. It will also be seen that as long as the train pipe pressure, in its tendency to pull point 38, of lever 25, in a downward direction, exceeds the tendency of the spring 40, or other opposing pressure to move the point 38, in the other direction, said point 38, will continue to move downwardly until the increasing disadvantage of its leverage acting against the increased strength of the spring 40, will strike a balance. The lever 25, therefore, will automatically take a definite position for every variation in pressure. When the piston 23, is held at the limit of its stroke the lever 25, is consequently held in a certain fixed position, enabling the link 28 to be rocked or swung about its point of pivoted connection with said lever 25, whenever the valve control handle 33 is operated to move the valve 34. When, however, the train pipe pressure falls below that of the opposing medium, in this instance the spring 40, then, under the influence of said opposing pressure acting through the links 27, and 30, the point 38, is shifted towards the left, and in a definite relation to the degree of fall of the train pipe pressure, thereby shifting the lever 25, and hence varying the fulcrum of link 28, thereby automatically moving the valve in a direction to close the ports which it controls. In other words, if the operating handle 33, is moved so as to open the exhaust port 37, the reduction in the pressure tends to cause such relative movement of the pistons 23 and 29, as to cause the valve to move back into position to close the exhaust port, and this restoration of the valve to closed position occurs whenever the pressure has attained the desired degree represented by the position of the control handle. Similarly, if the control handle has been moved to such position, as to open the supply port, the increase of the train pipe pressure thus imposed upon the piston 23, causes such a shifting of the lever 25, as to cause the valve to automatically close the supply port. Thus it will be seen that the pressure in the train pipe will at all times be kept automatically in a definite relation and proportion with reference to the position of the control handle. It will also be seen that if the train pipe pressure would vary by leakage of air into the system through the supply port, or out through the exhaust port, or through defective or worn joints or valves, or otherwise, the engineer's control valve will automatically move just enough one way or the other to reëstablish the desired pressure indicated by the position of the control handle, thereby insuring a brake cylinder pressure corresponding accurately with the position of the engineer's control handle, in direct action systems, while in indirect or exhaust systems it insures that the variation in the train pipe pressure corresponds accurately with the position of the engineer's control handle.

While I have shown a spring arranged to oppose the action of the train pipe pressure, it is obvious that other pressure mediums may be employed. I prefer to employ a spring rather than the main tank pressure for the reason that the main tank pressure varies and therefore would not give the uniform results which are desirable to secure.

I do not claim herein the specific construction of engineer's control valve shown and described as the same forms the subject matter of a separate application.

From the foregoing description it will be seen that I provide an exceedingly simple and efficient air brake system wherein the position of the engineer's control handle determines absolutely the pressure supplied to the brake cylinders.

It will also be seen that leaky valves or train pipes will not affect the operation of the brakes, and therefore the brakes cannot "creep on".

It will also be seen that since the operation of the triple valve is not dependent on variations in the pressure of the air in the auxiliary tank, said tank can be made as large as desired in proportion to the size of the brake cylinder, and consequently the reduction of the auxiliary tank pressure due to the expansion when air is admitted to the brake cylinder can be made as low as desired, and the corresponding possible brake pressure can be made practically as high as the original tank pressure.

It will also be seen that cars equipped with brake and triple valve mechanism embodying my inventions can be used in trains with cars equipped with the systems at present in use, and that an engineer's control valve embodying the principles of my invention, or an engine or a motor car equipped therewith, may be used in a train including cars equipped with the systems at present in use.

It will also be seen that in a system embodying the principles of my invention I secure a great economy in the consumption of air, and that the brake mechanism becomes operative instantly the train pipe pressure is reduced whether by the operation of the engineer's control valve, the operation of the emergency valves or the breaking of the coupling between cars, as in the systems at present in use.

Having now set forth the objects and nature of my invention and a construction embodying the principles thereof, and having explained such construction its purposes function and mode of operation, what I claim as new and useful, and of my own invention, and desire to secure by Letters Patent is:—

1. In an air brake system, a triple valve casing having train pipe, auxiliary reservoir, brake cylinder and exhaust ports, a valve arranged in said casing and adapted to control said auxiliary reservoir, brake cylinder and exhaust ports and means for controlling the operation of said valve through the conjoint action of the train pipe pressure and a differentially applied brake cylinder pressure.

2. In an air brake system, a triple valve casing having train pipe, auxiliary reservoir, brake cylinder and exhaust ports, a valve arranged in said casing and adapted to control said auxiliary reservoir, brake cylinder and exhaust ports, means for subjecting the same to the train pipe pressure, and means for augmenting the action of the train pipe pressure with a differentially applied brake cylinder pressure.

3. In an air brake system, a triple valve casing having train pipe, auxiliary reservoir, brake cylinder and exhaust ports, a valve arranged in said casing and adapted to control said auxiliary reservoir, brake cylinder and exhaust ports, and means for controlling the operation of said valve through the conjoint action of the train pipe pressure, an opposing spring and a differentially applied brake cylinder pressure.

4. In an air brake system, a triple valve casing, a piston valve arranged therein and having differential areas, auxiliary reservoir, brake cylinder and exhaust connections controlled by said piston valve, a train pipe connection delivering to one end of said piston valve, a spring opposing the train pipe pressure, the auxiliary reservoir pressure adapted to be delivered to said differential areas.

5. In an air brake system, a triple valve casing, train pipe, auxiliary tank, and brake cylinder connections thereto, a piston valve for controlling both the cylinder and tank connections, to the casing, the train pipe pressure being applied directly to said valve, a spring arranged to exert its tension upon said valve in opposition to the train pipe pressure, and means for augmenting the action of the train pipe pressure by a differentially applied brake cylinder pressure.

6. In an air brake system, a triple valve casing, auxiliary tank, and brake cylinder connections thereto, a valve, an auxiliary train pipe connection to said casing, and means for subjecting the valve to variations in brake cylinder pressure.

7. In an air brake system, a triple valve casing and valve, auxiliary tank, brake cylinder and exhaust connections to said casing and arranged to be controlled by said valve, a train pipe connection to said casing whereby said valve is subjected to variations in the train pipe pressure, means for also subjecting said valve to variations in brake cylinder pressure, independent means for opposing said pressures, and an auxiliary train pipe connection to said casing arranged to be controlled by said valve.

8. In an air brake system, a triple valve comprising connected pistons of different areas, a train pipe connection delivering to the face of one of said pistons, a spring opposing the train pipe pressure, and auxiliary tank, brake cylinder and exhaust connections controlled by said valve at points intermediate said pistons.

9. In an air brake system, a triple valve having connected pistons of different areas, a train pipe connection delivering to the face of one of said pistons, a spring operating against the remote face of the other of said pistons and in opposition to the train pipe pressure, and auxiliary tank, brake cylinder and exhaust port connections controlled by said valve.

10. In an air brake system, a triple valve constantly open to the action of the train pipe pressure, means for imposing a differential brake cylinder pressure upon said valve tending to move the same in the same direction as the train pipe pressure, a spring arranged to oppose the action of such pressures whereby said valve is operated automatically under varying conditions of train pipe pressure, auxiliary tank, brake cylinder and exhaust connections controlled by said valve, and arranged in such relation as to automatically maintain uniform pressure in the brake cylinder regardless of variations in the auxiliary tank pressure, or leakage.

11. In an air brake system, the combination of air brake cylinders, a triple valve and train pipe pressure controlling mechanism, of means for maintaining a braking pressure in inverse proportion to the train pipe pressure, regardless of leakage of pressure at any point in the system.

12. In an air brake system, a brake mechanism, a controlling mechanism and an auxiliary tank, in combination with a triple valve casing having an enlarged and a reduced cylinder, pistons respectively working in said cylinders, said pistons being connected together, one of said pistons controlling the auxiliary tank connection, and the other controlling the brake mechanism and exhaust connections, a train pipe connection delivering to the reduced cylinder, and a spring arranged in the enlarged cylinder to oppose the train pipe pressure.

13. In an air brake system, a brake mechanism, and a controlling mechanism having a handle in combination with means intermediate said mechanisms for maintaining the pressure in the brake cylinder in constant relation to the position of the control handle regardless of slight variations in the main tank pressure and regardless of slight leakage at any point in the system.

14. In an air brake system, a triple valve, means for moving said valve into position to admit pressure to the brake cylinder, and means for opposing said valve moving means with a differential brake cylinder pressure.

15. In an air brake system, a triple valve, means for moving said valve to admit pressure to the brake cylinder, and means for opposing said valve moving means with the conjoint action of the train pipe pressure and a differentially applied brake-cylinder pressure.

16. In an air brake mechanism, a triple valve comprising connected pistons of different areas, and connections whereby the brake cylinder pressure is imposed on both piston areas.

17. In an air brake system, a triple valve comprising connected pistons of different areas, means for supplying train pipe pressure against one of said pistons and means for supplying brake cylinder pressure to the space between said pistons.

18. In an air brake system, a triple valve comprising connected pistons of different areas a brake cylinder connection to the space between said pistons, and a train pipe connection delivering to one end of said pistons.

19. In an air brake system, a triple valve comprising connected pistons of different areas, a brake cylinder connection to the space between said pistons, a train pipe connection delivering to one end of one of said pistons, and a pressure medium imposed upon the opposite end of the other of said pistons.

20. In an air brake system, a triple valve and means for automatically adjusting said valve to compensate for leakage at any point in the system, whereby the brake cylinder pressure is maintained in inverse proportional relation to a definite train pipe pressure.

21. In an air-brake system, a brake mechanism, a controlling mechanism for the train pipe pressure, including an operating handle adapted to be set to various positions automatic means for establishing correspondingly varying conditions in the train pipe pressure, a triple valve subjected to the varying conditions of train pipe pressure and having differential areas, means for opposing the train pipe pressure and an auxiliary tank connection to the brake mechanism arranged to be controlled by said valve and delivering to the differential areas of said valve.

22. In an air brake system, a brake mechanism, a triple valve for controlling the supply of pressure thereto, and means whereby the pressure maintained in the brake cylinder through the operation of the triple valve is not effected by the movements of the valve due to leakage at any point in the system.

23. In an air brake system, a brake mechanism, a triple valve for controlling the supply of pressure thereto, and means whereby said valve automatically adjusts itself to compensate for leakage at any point therein.

24. In an air brake system, a brake mechanism, a train pipe and means for maintaining pressure in the brake mechanism in inverse proportion to the train pipe pressure within the limits of the sources of supply of such pressures.

25. In an air brake system, a brake mechanism, a controlling mechanism for the train pipe pressure including an operating handle adapted to be set to various positions, automatic means for establishing correspondingly varying conditions in the train pipe pressure, a triple valve subjected to the varying conditions of train pipe pressure said valve having differential areas, a spring arranged to act upon said valve in opposition to the train pipe pressure, and an auxiliary tank connection to the brake mechanism arranged to be controlled by said valve, and delivering to the differential areas of said valve.

26. In an air brake system, a triple valve and means for automatically moving the same to maintain inverse proportional relation between the brake cylinder and train pipe pressures within the limits of the pressures of the sources of supply, and regardless of leakage at any point in the system.

27. In an air brake system, a brake cylinder, a pressure controlling mechanism including an operating handle, and automatically operating means for maintaining a constant relation between the pressure in the brake cylinder and the position of the control handle, regardless of slight leakage at any point in the system, within the limits of pressure of the sources of pressure supply.

28. In an air brake system, a brake cylinder, a train pipe, and a train pipe pressure control mechanism including an operating handle in combination with automatic means for maintaining a definite and uniform pressure in the brake cylinder for each position of the operating handle regardless of slight leakage at any point in the system.

29. In an air brake system, a brake cylinder, a train pipe, and a train pipe pressure, controlling mechanism including an operating handle, in combination with means for maintaining a definite and uniform pressure in the brake cylinder for each position of the operating handle, within the limits of pressure of the sources of supply thereof, and regardless of slight leakage at any point in the system.

30. In an air brake system, a brake cylinder, a train pipe, and a train pipe pressure controlling mechanism, in combination with means whereby, under normal conditions the pressure in the brake cylinder is varied solely by varying the position of the control handle.

In testimony whereof I have hereunto set my hand in the presence of the subscribing witnesses, on this 28th day of March A. D., 1907.

HAROLD ROWNTREE.

Witnesses:
JOSEPH KLEIN,
S. E. DARBY.